Dec. 12, 1961 R. W. CASTOR 3,013,121

AUTOMATIC PHASING LOCKOUT FOR FACSIMILE APPARATUS

Filed June 8, 1959 2 Sheets-Sheet 1

INVENTOR.
RICHARD W. CASTOR

BY

Ooms, McDougall, Williams & Hersh

ATTORNEYS

INVENTOR.
RICHARD W. CASTOR
BY Toms, McDougall, Williams & Hersh
ATTORNEYS

3,013,121
AUTOMATIC PHASING LOCKOUT FOR FACSIMILE APPARATUS

Richard W. Castor, Bellwood, Ill., assignor to Stewart-Warner Corporation, Chicago, Ill., a corporation of Virginia Filed June 8, 1959, Ser. No. 818,952
8 Claims. (Cl. 178—69.5)

This invention relates to facsimile systems of the type having synchronized rotary scanning devices at the transmitting and receiving stations.

One object of the present invention is to provide a new and improved arrangement for terminating the phasing operation after the scanner at the receiving station has been synchronized with the transmitting scanner.

A further object is to provide a new and improved phasing arrangement of the type in which the receiving scanner is phased by causing it to be retarded in phase until it is in the correct phasing position, the arrangement being such that the phasing operation is automatically terminated as soon as the receiving scanner is correctly positioned, so that the receiving scanner will not drop out of phase due to the reception of noise or other transients.

Another object is to provide a new and improved apparatus of the foregoing character, whereby the phasing operation is carried out positively and expeditiously, and then is automatically and promptly terminated when the receiving scanner is in the correct position.

A further object is to provide an automatic phasing lockout which is extremely effective, yet is remarkably simple and low in cost.

Further objects and advantages of the present invention will appear from the following description, taken with the accompanying drawings, in which.

Figure 1:
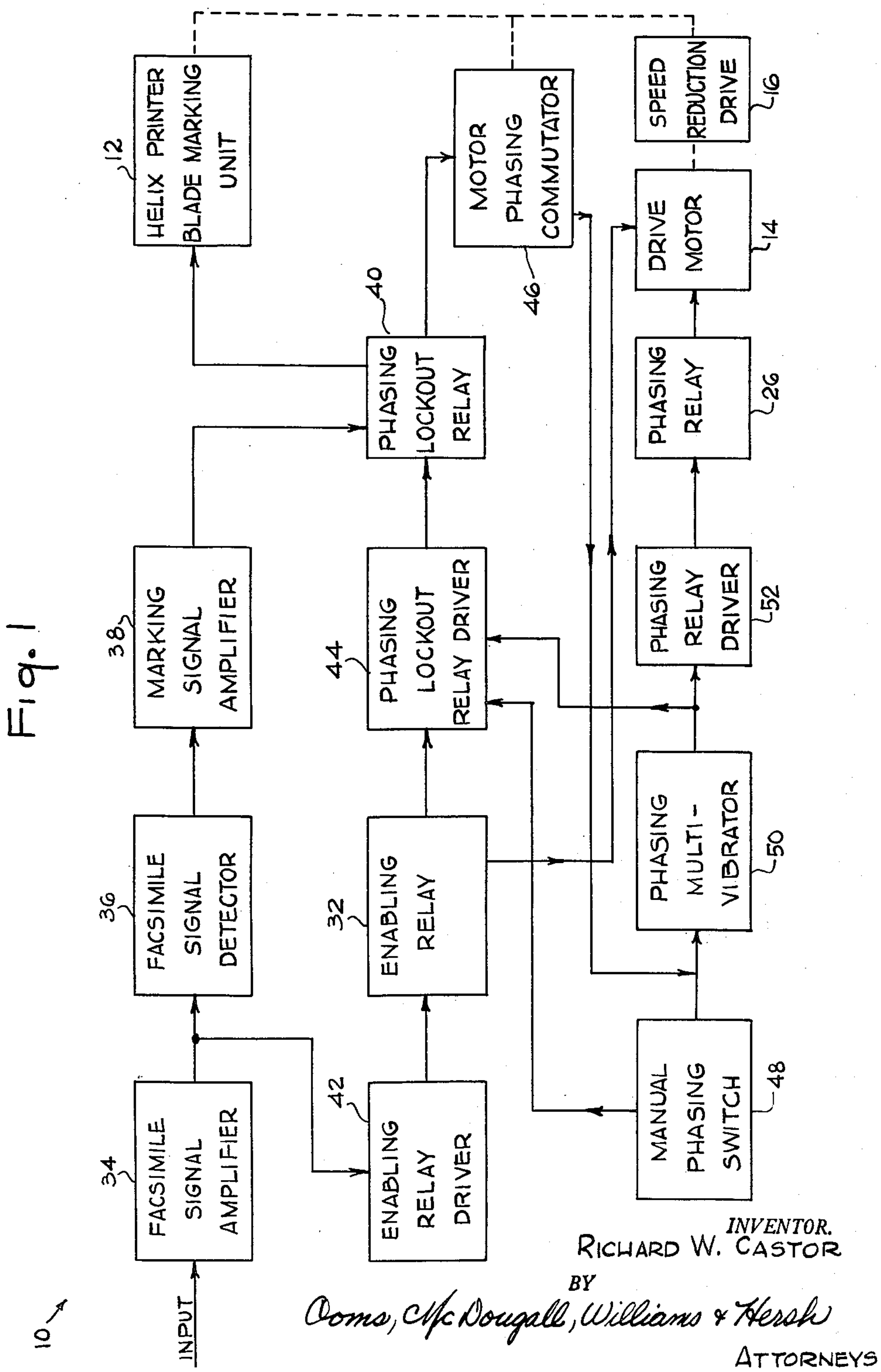
FIG. 1 is a schematic block diagram illustrating a facsimile receiver to be described as an illustrative embodiment of the present invention.

The present invention relates to facsimile systems of the type in which the material to be transmitted is scanned at the transmitting station by a rotary scanner, so as to produce facsimile signals. At the receiving station, the facsimile signals are fed to a rotary receiving scanner, adapted to reproduce a copy of the material transmitted. In a system of this type, the receiving scanner must be synchronized with the transmitting scanner. Thus, the receiving scanner must be driven at the same speed as the transmitting scanner. Moreover, the instantaneous position or phase of the receiving scanner must correspond precisely with the phase or instantaneous position of the transmitting scanner.

The present drawings illustrate a facsimile receiver 10 utilizing a rotary scanner or readout unit 12. It will be seen that the scanner 12 is driven by a synchronous alternating current motor 14 through a set of reduction gears or other speed reducer 16. The motor 14 may operate at any suitable speed, such as 1800 r.p.m. or 3600 r.p.m. Through the reduction gears 16, the scanner 12 may be driven at a considerably lower speed, such as 180 r.p.m. or 360 r.p.m.

The motor 14 may receive its operating power from a pair of power input leads 17 and 18, which may be connected to an ordinary commercial alternating current power line operating at 117 volts and 60 cycles, or some other suitable combination of voltage and frequency. In many facsimile systems, the drive motors for the transmitting and receiving scanners may readily be connected to different points in the same overall electric power system, in which case the receiving motor is inherently driven at the same speed as the transmitting motor. Where the receiving station is located on a different electric power system than the transmitting station, the receiving drive motor 14 may be supplied with power derived from an amplified signal transmitted between the transmitting and receiving stations, or by a special, local source of power which may be adjusted with a high degree of precision to the frequency of the alternating current power at the transmitting station. Any of these means will insure that the receiving motor 14 is driven at the same speed as the transmitting motor.

However, it is also necessary to phase the receiving scanner 12 so that it will correspond precisely in its instantaneous position with the transmitting scanner. Because of the reduction gears 16, there are a large number of possible phasing positions of the scanner 12. For example, if the motor 14 has four poles and the gears 16 have a ratio of 10 to 1, there are forty possible positions of the scanner 12, only one of which is the correct phasing position.

The present invention is applicable to scanners of various types, but it is preferred that the scanner 12 be of the type comprising a helical blade, wire or other electrode, mounted on a drum or other rotary member. Such a scanner may advantageously be used in connection with an electrolytic marking system. Thus, the material transmitted may be reproduced on a web of paper which is dampened with an electrolytically conductive material, adapted to be darkened by the passing of an electric current therethrough. The paper may be fed between the rotating helical electrode 12 and a stationary electrode 20 in the form of a straight thin bar or the like extending across the web of the paper. A sliding connection may be made to the helical scanner 12 by means of a stationary brush 22, which engages a slip ring 24, connected to and adapted to rotate with the scanner 12.

It is preferred to phase the scanner 12 by causing the motor 14 to be retarded progressively in phase, until the scanner arrives at the correct phasing position. In the illustrated arrangement, the motor 14 is caused to drop back in phase by momentarily cutting its source of power. This causes the motor to slip poles. The power to the motor is adapted to be cut momentarily by a phasing relay 26 having normally closed contacts 26*a* and 26*b*, connected in series with the motor 14. The relay 26 has a coil 26*c* which may be energized to open the contacts 26*a* and 26*b*. Momentary energization of the coil 26*c* for a suitable interval causes the motor 14 to slip back one pole in phase.

A series power circuit for the motor 14 may be traced from the lead 17 through the motor 14, a lead 28, the contacts 26*a* and 26*b*, a lead 30, and contacts 32*a* and 32*b* of an enabling relay 32, to the power lead 18. The contacts 32*a* and 32*b* are normally open and are adapted to be closed by energization of a relay coil 32*c*. The purpose of the enabling relay 32 is to start the drive motor 14 whenever signals are received from the transmitting station. When no signal is received, the enabling relay 32 is deenergized, with the result that the motor 14 is stopped.

FIG. 1 illustrates the general layout of the facsimile receiver 10. It will be seen that the facsimile signals received from the transmitting station are applied to the input of a facsimile signal amplifier 34. The illustrated receiver is adapted to receive facsimile signals in the form of a modulated carrier. The amplifier 34 is adapted to amplify the modulated carrier. The output of the amplifier 34 is applied to the input of a facsimile signal detector 36 which demodulates the incoming signals. Thus, the facsimile signals themselves appear at the output of the detector 36. These signals are amplified by a marking signal amplifier 38, and then are applied, through a phasing lockout relay 40, to the scanner or marking unit 12.

The enabling relay 32 is adapted to be operated by a driver 42 which receives its input signals from the facsimile signal amplifier 34. In addition to controlling the operation of the drive motor 14, the enabling relay exercises operating control over a driver 44 for the phasing lockout relay 40. The control is such that the phasing lockout relay 40 is held in an energized state until the enabling relay has been operated. In the initial or passive condition of the receiver, the relay 40 is energized, so that the output signals from the marking signal amplifier 38 are fed to the single segment commutator or switch 46, adapted to rotate with the scanner 12. The commutator 46 provides means for detecting whether the scanner 12 is correctly phased with respect to the scanner at the transmitting station.

During the initial portion of every facsimile transmission, the transmitter generates a series of phasing pulses which are synchronized with the rotation of the transmitting scanner. The phasing pulses may have a wave form similar to that indicated at 47 in FIG. 2. It will be seen that the phasing pulses are essentially square waves with brief intervals or spaces 49 therebetween. Unless the receiving scanner 12 is correctly phased, the phasing commutator 46 transmits at least a portion of each phasing pulse. If the receiving scanner 12 is correctly phased, the commutator 46 is oriented so that its brief intervals of conduction are synchronized with the spaces 49 between the phasing pulses 47. In that case, the phasing pulses are not transmitted through the commutator 46.

Each sampling pulse transmitted by the commutator 46 is utilized to operate the phasing relay 26 so as to cause the drive motor 14 to slip back one pole. Eventually, the motor 14 will slip back to a point such that the receiving scanner 12 is correctly phased. The commutator 46 will then transmit no more sampling pulses, with the result that the motor 14 will normally continue to operate in the correctly phased condition. However, under certain conditions, it is possible for a noise pulse or transient to actuate the phasing relay 26, in which case the motor 14 will be thrown out of phase. It may then be necessary to rephase the motor 14 by repeatedly operating a manual phasing switch 48.

It will be seen that the signals from the commutator 46 are applied to a pulse generator, which preferably takes the form of a multivibrator 50. The purpose of the multivibrator is to generate a pulse of standard amplitude and duration in response to each pulse received from the commutator 46. In some cases, the multivibrator 50 may be arranged to provide only one standardized pulse for every other sampling pulse received from the commutator 46. The standardized pulses from the multivibrator are of such a length as to insure that the phasing relay 26 will cause the motor 14 to slip back one pole. It will be realized that the standardized pulses must be long enough to insure that the motor 14 will slip a pole, yet short enough to prevent the motor from slipping back more than one pole. The pulses from the multivibrator 50 are amplified by a driver 52, which actually operates the phasing relay 26.

After the motor 14 has been correctly phased, the phasing lockout relay 40 is caused to drop out, so as to switch the output of the marking signal amplifier 38 to the scanner 12. Thus, the commutator 46 is disconnected from the amplifier 38 so that the commutator will not receive any further phasing or noise signals. The present invention is concerned with an arrangement whereby the phasing lockout relay 40 is automatically deenergized, as soon as the motor 14 is correctly phased.

As already indicated, the lockout relay 40 is adapted to be operated by the driver 44. This driver receives input signals from the output of the phasing multivibrator 50. The arrangement of the driver 44 is such that the deenergization of the lockout relay 46 is prevented as long as pulses are received by the driver 44 from the multivibrator 50. When the commutator 46 is correctly phased, the signals from the multivibrator 50 cease. The driver 44 thereupon deenergizes the lockout relay 40, so as to switch the output of the marking signal amplifier 38 from the commutator 46 to the scanner 12. This operation completely disables the phasing components, comprising the commutator 46, the multivibrator 50, the phasing relay driver 52 and the phasing relay 26. Thus, the drive motor 14 will remain in its correctly phased position.

The manual phasing switch 48 is operative to generate a pulse which is routed directly to the multivibrator 50, so as to cause the motor 14 to slip back one pole. It will be evident that the switch 48 must ordinarily be operated repeatedly to rephase the motor 14. The switch 48 is also operative to disconnect the lockout relay driver 44 from the multivibrator 50, so that the manually generated phasing pulses will not result in operation of the lockout relay 40.

Figure 2:
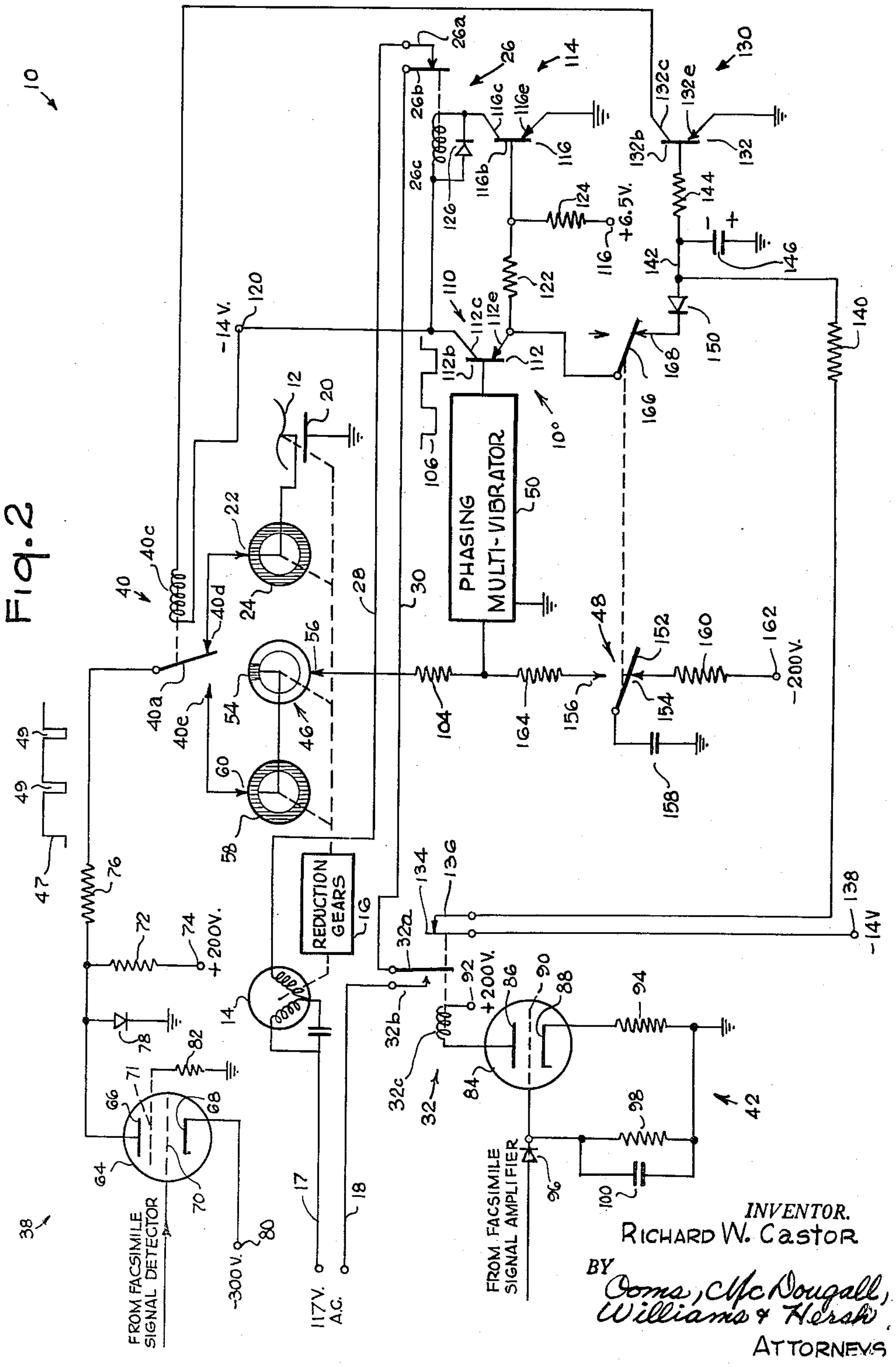
FIG. 2 is a schematic diagram showing the detailed arrangement of the automatic phasing lockout device.

As shown in FIG. 2, the phasing commutator 46 comprises a single narrow conductive segment 54, adapted to be engaged by a brush 56. A continuous connection may be established to the segment 54 by a slip ring 58 connected to the segment and adapted to rotate with the commutator 46. The slip ring 58 is engaged by a brush 60.

It will be seen that the phasing lockout relay 40 comprises a contact 40*a* which is movable between contacts 40*d* and 40*e*. Normally, the contact 40*a* engages the contact 40*d*, which is connected to the brush 22, and thence to the scanner 12. The relay 40 also includes a coil 40*c* which may be energized to move the contact 40*a* against the contact 40*e*. It will be seen that the contact 40*e* is connected to the brush 60, and thence to the commutator 46.

The marking signal amplifier 38 may be of any suitable construction. Thus, it may include the illustrated vacuum tube 64 having an anode 66, a cathode 68, a control grid 70, and a screen grid 71. The signals from the facsimile signal detector 36 are applied to the grid 70. In this case, a resistor 72 is connected between the anode 66 and a power supply terminal 74, adapted to supply a positive voltage of 200 volts, or some other suitable voltage. A resistor 76 of low value is connected between the anode 66 and the movable contact 40*a* on the lockout relay 40. Thus, the phasing or facsimile signals from the tube 64 are fed to the relay 40 which routes them to either the commutator 46 or the scanner 12. A diode 78 may be connected between the anode 66 and ground. The cathode 68 is connected to a power supply terminal 80 adapted to supply a negative direct current voltage at 300 volts, or some other suitable value, with respect to ground. The screen grid 71 may be connected to ground through a low value resistor 82, adapted to suppress parasitic oscillations in the tube 64.

When the marking signals are routed to the scanner 12, the bulk of the anode current in the tube 64 passes through the dampened, electrolytically conductive paper between the helical scanner 12 and the stationary electrode 20. It will be noted that the current between the scanner 12 and the electrode 20 is negative in polarity. The resistor 72 is of such a high value that it merely bleeds a small amount of current from the anode 66. This action improves the linearity of the amplifier 38 at low current levels. The diode 78 clamps the anode 66 to ground against the development of any substantial positive voltage. This action prevents any substantial flow of positive current between the scanner 12 and the electrode 20.

The enabling relay driver 42 may be of any suitable construction. As shown, it includes an amplifier in the form of a vacuum tube 84, having an anode 86, a cathode 88, and a grid 90. In this case, the coil 32c of the enabling relay 32 is connected between the anode 86 and a power supply terminal 92 adapted to supply a positive potential at some suitable voltage, such as 200 volts. The cathode 88 is connected to ground through a self-biasing resistor 94.

The facsimile signals are applied to the grid 90 through a diode rectifier 96. A resistor 98 is connected between the grid 90 and ground to serve as a grid return resistor, as well as a load resistor for the diode 96. It will be seen that a capacitor 100 is connected across the resistor 98. When either phasing pulses or facsimile signals are received from the transmitter, a positive voltage develops between the grid 90 and ground. As a result, the anode current in the tube 84 increases sufficiently to operate the relay 32.

During the phasing operation, the pulses from the commutator 46 are carried to the phasing multivibrator 50 by a resistor 104. As already indicated, the multivibrator 50 may be arranged in any known or suitable manner to produce pulses of standardized amplitude and duration in response to the pulses received from the commutator 46. In FIG. 2 the wave form of the pulses at the output of the multivibrator 50 is indicated at 106.

In this case, a two-stage driver 108 is connected to the output of the multivibrator 50 to control the operation of the phasing relay 26. The illustrated driver comprises a first stage 110 which utilizes a transistor 112 connected to a grounded collector circuit. The stage 110 drives a second stage 114 which utilizes a transistor 116 in a grounded emitter circuit.

More specifically, the transistor 112 has a base 112*b*, an emitter 112*e*, and a collector 112*c*. The signals from the multivibrator 50 are applied between the base 112*b* and the collector 112*c*, which is connected directly to a power supply terminal 120, adapted to supply a suitable negative voltage, such as 14 volts.

Similarly, the transistor 116 has a base 116*b*, an emitter 116*e* and a collector 116*c*. The output of the transistor 112 is taken from the emitter 112*e* and is applied to the base 116*b* of the transistor 116. Thus, resistor 122 is connected between the emitter 112*e* and the base 116*b*. The transistor 116 is normally biased to cut off by providing a resistor 124 which is connected between the base 116*b* and a power supply terminal 126 adapted to supply a suitable positive voltage, such as 6.5 volts. It will be seen that the emitter 116*e* is connected directly to ground.

The coil 26*c* of the phasing relay 26 is connected between the collector 116*c* and the negative power supply terminal 120. A diode 126 may be connected across the relay coil 26*c* to modify the drop-out characteristics of the relay.

As already indicated, the transistor 116 is normally cut off. However, each pulse received from the multivibrator 50 by way of the grounded collector stage 110 causes the transistor 116 to conduct, so as to energize the relay coil 26*c*. In this way, the contacts 26*a* and 26*b* are opened momentarily for an interval sufficient to cause the motor 14 to slip back one pole.

After a sufficient number of pulses have been received from the commutator 46, the motor 14 arrives at its position of correct phasing. The commutator segment 54 is then so oriented that the phasing pulses are not transmitted to the multivibrator 50. Accordingly, no further phasing occurs, unless a noise pulse of sufficient amplitude is transmitted to the multivibrator 50. In this case, the motor 14 will be thrown out of phase.

In accordance with the present invention, however, the phasing lockout relay 40 is arranged to drop out in response to the absence of pulses from the commutator 46. The dropping out of the relay 40 switches the output of the driver stage 38 to the scanner 12, so that noise pulses will not be transmitted to the commutator 46.

In the illustrated arrangement, a driver or amplifier 130 is provided to actuate the relay 40. As shown, the driver 130 utilizes a transistor 132 having a base 132*b*, an emitter 132*e*, and a collector 132*c*. The emitter 132*e* is connected directly to ground, while the collector 132*c* is connected to the negative power supply terminal 120 through the lockout relay coil 40*c*. The input to the driver 130 is applied between the base 132*b* and the emitter 132*e*.

The lockout relay driver 130 is tied to the enabling relay 32 in such a way that the lockout relay 40 is actuated whenever the enabling relay 32 is not actuated. Thus, in the absence of received signals, the lockout relay 40 is actuated. This tie-in is accomplished by providing a set of normally closed contacts 134 and 136 on the enabling relay 32. These contacts 134 and 136 are employed to apply an actuating bias to the base 132*b* of the transistor 132. The actuating bias may be derived from a negative power supply terminal 138 at some suitable voltage, such as 14 volts. A circuit may be traced from the terminal 138 to the base 132*b* through the contacts 134 and 136, a resistor 140, a lead 142, and a resistor 144. A capacitor 146 is connected between the lead 142 and ground, so as to be charged by the negative biasing voltage.

As soon as signals are received from the transmitter the enabling relay 32 is energized. This opens the contacts 134 and 136 and disconnects the negative biasing voltage from the base 132*b*. The capacitor 146 tends to discharge through the resistor 144 and the transistor 132. This would tend to diminish the biasing voltage to such an extent that the transistor 132 would cut off, and the relay 40 would drop out. However, the present arrangement is such that the sampling pulses from the commutator 46 are employed to maintain the transistor 132 in a conductive state, so that the relay 40 will remain energized until the motor 14 is correctly phased. Specifically, the output pulses from the multivibrator 50 are applied to the input of the transistor 132. The multivibrator output pulses are taken from the emitter 112*e* of the transistor 112. These pulses are of negative polarity. The pulses are transmitted to the input lead 142 through a diode 150, which is polarized to transmit the pulses, while preventing the capacitor 146 from discharging through the emitter circuit of the transistor 112. The negative pulses maintain the negative charge on the capacitor 146, so as to keep the transistor 132 in a conductive state.

When the motor 14 is correctly phased, the commutator 46 no longer transmits sampling pulses. Accordingly, the multivibrator 50 no longer delivers the negative pulses to the capacitor 146. As a result, the capacitor discharges through the resistor 144 and the transistor 132, at a rate determined by the time constant of the circuit. The loss of negative actuating bias causes the transistor 132 to cut off. Thus, the lockout relay 40 is deenergized. The relay contact 40*a* then switches the output of the amplifier 38 from the commutator 46 to the reproducing scanner 12. This obviates any possibility that stray pulses might be transmitted by the commutator 46 to the multivibrator 50, to actuate the phasing relay 26 and throw the motor 14 out of phase.

The time constant of the capacitor 146 and the resistor 144 may be made long enough to prevent lockout due to momentary loss of carrier during the phasing period caused by any switching troubles in the transmitter or the link between the transmitter and the receiver. For example, the time constant may be in the order of a second or two.

Occasionally it may be necessary or desirable to rephase the motor 14 manually. As already indicated, a manual phasing switch 48 is employed to provide for this possibility. It will be seen that the switch 48 comprises a switch contact 152 which normally engages a contact 154 but is movable against a contact 156. The purpose of the switch 48 is to provide a pulse to actuate the multivibrator 50 and thereby cause the motor 14 to slip poles. In this case, each manual phasing pulse is developed by discharging a capacitor 158 into the input circuit of the multivibrator 50. It will be seen that the capacitor 158 is connected between the movable switch contact 152 and ground. To charge the capacitor 158, a resistor 160 is connected between the switch contact 154 and a power supply terminal 162, adapted to supply a negative potential at 200 volts, or some other suitable voltage. When the switch 48 is inactive, the contact 152 engages the contact 154, with the result that the capacitor 158 is charged.

The switch contact 156 is connected to the input of the multivibrator 50 through a resistor 164. When the switch contact 152 is transferred manually to the contact 156, the capacitor 158 discharges through the resistor 164 into the input circuit of the multivibrator 50. This triggers the multivibrator so that it develops a pulse to actuate the phasing relay 26. Accordingly, the motor 14 slips back one pole. By operating the switch 48 repeatedly, the motor 14 may be caused to slip back until it reaches the correctly phased position. For convenience, the switch 48 may be of the push button type.

The present circuit is arranged so that the manually derived phasing pulses will not affect the phasing lockout relay 40. This is accomplished by inserting additional switch contacts 166 and 168 in series with the diode 150 which carries the negative pulses from the output of the multivibrator 50 to the input of the transistor 132. The contact 166 normally engages the contact 168 but is movable away from the contact 168 when the switch 48 is operated. Thus, the movable switch contacts 152 and 166 are mechanically connected for simultaneous operation.

This arrangement prevents the manually induced phasing pulses, produced by the multivibrator 50, from charging the capacitor 146, which would tend to render the transistor 132 conductive so as to actuate the relay 40. Such actuation of the relay 40 would switch the output of the amplifier 38 to the commutator 46, so that the output signals from the amplifier 38 would cause further operation of the phasing relay 26. This would interfere with the manual phasing operation. It will be understood that manual phasing is normally undertaken after the transmitter has stopped sending out the special phasing pulses. Thus, it is highly desirable to disable the lockout relay driver 130 when the manual phasing switch 48 is operated.

The automatic phasing lockout arrangement of the present invention operates quickly and positively to prevent the possibility of further phasing, as soon as the motor 14 and the commutator 46 are correctly phased. When this condition exists, the commutator 46 ceases to transmit sampling pulses. In response to the absence of such pulses, the lockout relay driver 130 deenergizes the lockout relay 40, so that the output of the marking signal amplifier 38 is transferred from the commutator 46 to the reproducing scanner 12. This obviates the possibility that noise pulses or other transients might throw the motor 14 out of phase.

The phasing lockout arrangement is effective, yet remarkably inexpensive, so that very little cost, if any, is added to the overall cost of the receiver.

Various modifications, alternative constructions and equivalents may be employed without departing from the true spirit and scope of the invention, as exemplified in the foregoing description, and defined in the following claims.

I claim:

1. In a facsimile system, the combination comprising a rotary scanning device, a synchronous motor for driving said scanning device, a set of reduction gears connected between said motor and said scanning device, circuit means including a phasing relay for momentarily deenergizing said motor to cause said motor to slip poles and thereby drop back in phase, an input circuit for receiving a train of phasing pulses, a signal amplifier having its input connected to said input circuit, a commutator rotatable with said scanning device, circuit means including a lockout relay for switching the output of said amplifier between said commutator and said scanning device in first and second positions of said lockout relay, said lockout relay including contact means which in the absence of signals in said input circuit connect to output of said amplifier to said commutator, means connected between the output of said commutator and said phasing relay for momentarily operating said phasing relay in response to each pulse received from said commutator, said commutator having a single segment included in circuit means to carry a sampling pulse from the output of said amplifier to said last-mentioned means except when said scanning device is in its correctly phased position, and amplifier means for shifting said lockout relay to said second position with the output of said signal amplifier switched to said scanning device, in response to the absence of phasing pulses at the output of said commutator, so as to maintain said scanning device in its correctly phased position.

2. In a facsimile receiver, the combination comprising a circuit for receiving phasing pulses and facsimile signals, a rotary scanning device for reproducing the facsimile signals, a synchronous motor for driving said scanning device, a set of reduction gears between said motor and said scanning device, a phasing commutator rotatable with said scanning device, circuit means including a phasing relay for momentarily cutting the power to said motor so that said motor will slip poles, circuit means including a lockout relay operable between phasing and reproducing positions for switching said circuit between said commutator and said scanning device, respectively, circuit means including an enabling relay for starting said motor, means for operating said enabling relay in response to the presence of signals in said circuit, means including a phasing multivibrator connected between said commutator and said phasing relay for operating said phasing relay momentarily in response to each phasing pulse received from said commutator, said commutator having a single segment included in circuit means to carry phasing pulses to said multivibrator except when said scanning device is correctly phased, a lockout driver for actuating said lockout relay, said enabling relay having means for controlling said lockout driver so that said lockout relay will be held in said phasing position until said enabling relay is actuated, means for connecting the input of said lockout driver to the output of said multivibrator to feed phasing pulses to said driver to maintain said lockout relay in said phasing position, said driver being effective to shift said lockout relay to said recording position in response to the absence of pulses from said multivibrator, so as to maintain said scanning device in its correctly phased position.

3. In a facsimile receiver, the combination comprising a circuit for receiving phasing pulses and facsimile signals, a rotary scanning device for reproducing the facsimile signals, a synchronous motor for driving said scanning device, a set of reduction gears between said motor and said scanning device, a phasing commutator rotatable with said scanning device, circuit means including a phasing relay for momentarily cutting the power to said motor so that said motor will slip poles, circuit means including a lockout relay operable between phasing and recording positions to switch said circuit between said commutator and said scanning device, circuit means including an enabling relay for starting said motor, means for operating said enabling relay in response to the presence of signals in said circuit, means including a phasing multivibrator connected between said commutator and said phasing relay for operating said phasing relay momentarily in response to each phasing pulse received from said commutator, said commutator having a single segment included in circuit means to carry phasing pulses to said multivibrator except when said scanning device is correctly phased, a lockout amplifying device for actuating said lockout relay, said enabling relay having means for supplying a bias to said lockout amplifying device to hold said lockout relay in said phasing position when said enabling relay is not actuated, said lockout amplifying device having an input circuit connected to receive phasing pulses from said multivibrator and operative to develop a bias in response to said pulses to hold said lockout relay in said phasing position, said last-mentioned bias being lost in the absence of pulses from said multivibrator, said lockout amplifying device thereupon being operative to shift said lockout relay to said recording position to prevent further phase slipping of said motor.

4. In a facsimile receiver, the combination comprising a circuit for receiving phasing pulses and facsimile signals, a rotary scanning device for reproducing the facsimile signals, a motor for driving said scanning device, a phasing commutator rotatable with said scanning device, circuit means including a phasing relay for momentarily cutting the power to said motor so that said motor will slip backward in phase, a lockout relay having phasing and recording positions and effective by operation between said respective positions to switch to circuit between said commutator and said scanning device, means connected between said commutator and said phasing relay for operating said phasing relay momentarily in response to each phasing pulse received from said commutator, said commutator having a single segment included in circuit means to transmit phasing pulses except when said scanning device is correctly phased, a lockout amplifying device for controlling said lockout relay, said lockout amplifying device having an input circuit connected to receive phasing pulses from said commutator and operative in response to said pulses to hold said lockout relay in said phasing position, said lockout amplifying device being operative to shift said lockout relay to said recording position in response to absence of pulses from said commutator.

5. In a facsimile receiver, the combination comprising a circuit for receiving phasing pulses and facsimile signals, a rotary scanning device for reproducing the facsimile signals, a synchronous motor for driving said scanning device, a phasing commutator rotatable with said scanning device, circuit means including a phasing relay for momentarily cutting the power to said motor so that said motor will slip poles, circuit means including a lockout relay operable between phasing and reproducing positions and effective by movement between said respective positions to switch said circuit between said commutator and said scanning device, means connected between said commutator and said phasing relay for operating said phasing relay momentarily in response to each phasing pulse received from said commutator, said commutator having a single segment included in circuit means to transmit phasing pulses except when said scanning device is correctly phased, a lockout driver for actuating said lockout relay, means responsive to signals in said circuit for initially operating said lockout relay to said phasing position in response to absence of signals in said circuit, and means responsive to pulses from said commutator for holding said lockout relay in said phasing position, said last-mentioned means being effective to shift said lockout relay to said reproducing position upon the cessation of pulses from said commutator.

6. In a facsimile system, the combination comprising a rotary scanning device, a synchronous motor for driving said scanning device, circuit means including a phasing relay for momentarily deenergizing said motor to cause said motor to slip poles and thereby drop back in phase, a circuit for receiving a train of phasing pulses, a commutator rotatable with said scanning device, circuit means including a lockout relay for switching said circuit between said commutator and said scanning device in first and second positions of said lockout relay, means connected between the output of said commutator and said phasing relay for momentarily operating said phasing relay in response to each pulse received from said commutator, said commutator having a single segment included in circuit means to carry portions of said phasing pulses from said circuit to said last-mentioned means except when said scanning device is in its correctly phased position, and amplifier means for shifting said lockout relay to said second position in response to the absence of pulses at the output of said commutator, so as to maintain said scanning device in its correctly phased position.

7. In a facsimile receiver, the combination comprising a circuit for receiving phasing pulses and facsimile signals, a rotary scanning device for reproducing the fassimile signals, a synchronous motor for driving said scanning device, a phasing commutator rotatable with said scanning device, circuit means including a phasing relay for momentarily cutting the power to said motor so that said motor will slip poles, circuit means including a lockout relay operable between phasing and reproducing positions for switching said circuit between said commutator and said scanning device, respectively, circuit means including an enabling relay for starting said motor, means for operating said enabling relay in response to the presence of signals in said circuit, means connected between said commutator and said phasing relay for operating said phasing relay momentarily in response to each phasing pulse received from said commutator, said commutator having a single segment included in circuit means to carry phasing pulses to said last-mentioned means except when said scanning device is correctly phased, a lockout driver for actuating said lockout relay, said enabling relay having means for controlling said lockout driver so that said lockout relay will be held in said phasing position until said enabling relay is actuated, means for connecting the input of said lockout driver to the output of said commutator to feed phasing pulses to said driver to maintain said lockout relay in said phasing position, said driver being effective to shift said lockout relay to said reproducing position in response to the absence of pulses from said multivibrator, so as to maintain said scanning device in its correctly phased position.

8. In a facsimile receiver, the combination comprising a circuit for receiving phasing pulses and facsimile signals, a rotary scanning device for reproducing the facsimile signals, a synchronous motor for driving said scanning device, a phasing commutator rotatable with said scanning device, circuit means including a phasing relay for momentarily cutting the power to said motor so that said motor will slip poles, circuit means including a lockout relay operable between phasing and reproducing positions to switch said circuit between said commutator and to said scanning device, circuit means including an enabling relay for starting said motor, means for operating said enabling relay in response to the presence of signals in said circuit, means connected between said commutator and said phasing relay for operating said phasing relay momentarily in response to each phasing pulse received from said commutator, said commutator having a single segment included in circuit means to transmit phasing pulses except when said scanning device is correctly phased, a lockout amplifying device for actuating said lockout relay, said enabling relay having means for supplying a bias to said lockout amplifying device to hold said lockout relay in said phasing position when said enabling relay is not actuated, said lockout amplifying device having an input circuit connected to receive phasing pulses from said commutator and operative to develop a bias in response to said pulses to hold said lockout relay in said phasing position, said last-mentioned bias being lost in the absence of pulses from said commutator, said lockout amplifying device thereupon being operative to shift said lockout relay to said reproducing position to prevent further phase slipping of said motor.

References Cited in the file of this patent

UNITED STATES PATENTS

| | | |
|---|---|---|
| 2,835,733 | Smith | May 20, 1958 |
| 2,874,218 | Allen et al. | Feb. 17, 1959 |